United States Patent Office 3,417,325
Patented Dec. 17, 1968

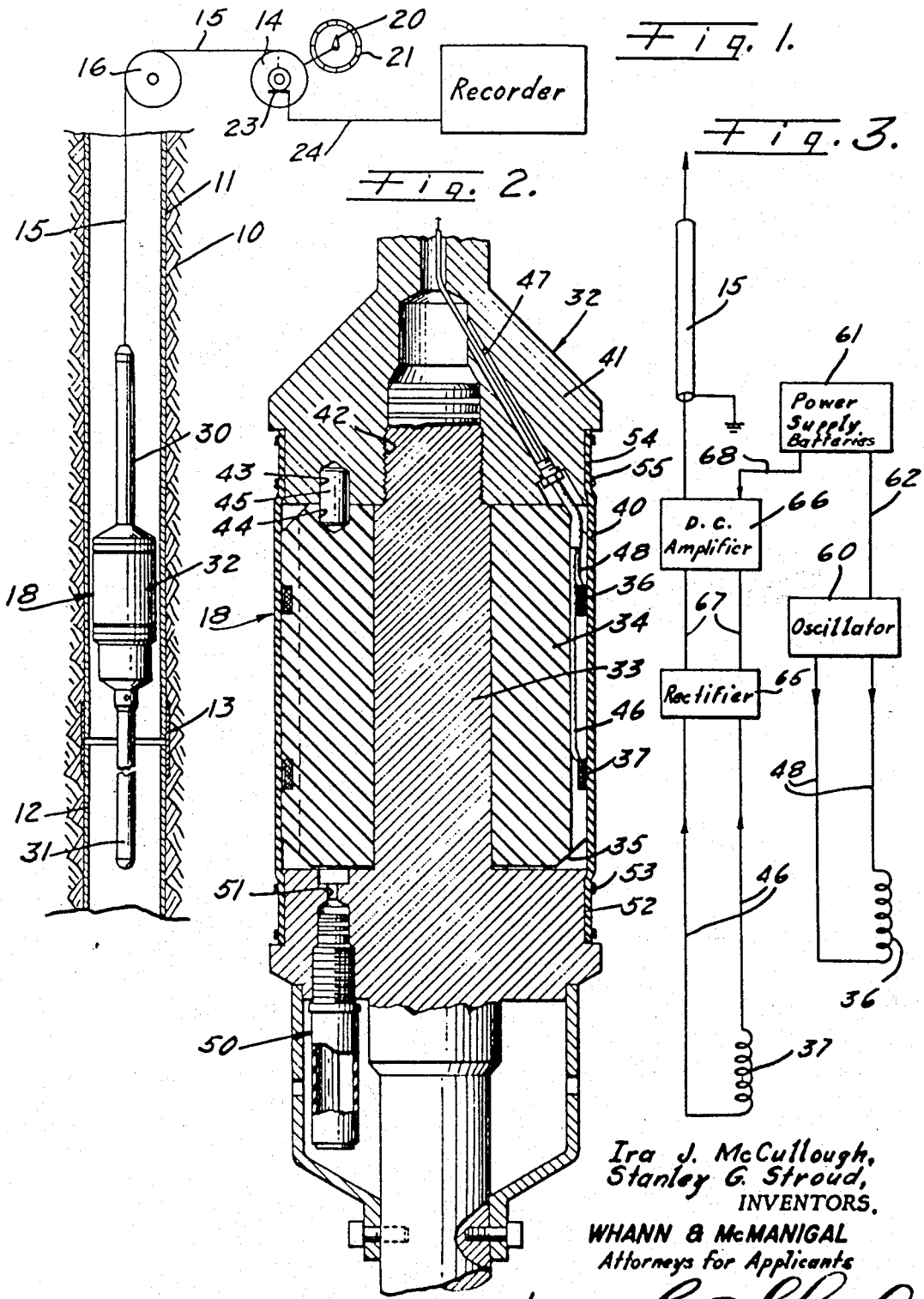

3,417,325
INSIDE PIPE DIAMETER CALIPER USING COAXIAL EXCITATION AND PICKUP COILS
Ira J. McCullough, 10845 Sunset Blvd., Los Angeles, Calif. 90024, and Stanley G. Stroud, 2109 Summerland, San Pedro, Calif. 90731
Continuation of application Ser. No. 626,358, Mar. 7, 1967, which is a continuation of application Ser. No. 422,175, Dec. 30, 1964. This application Feb. 15, 1968, Ser. No. 705,860
5 Claims. (Cl. 324—34)

ABSTRACT OF THE DISCLOSURE

A device for electronically determining the inside diameter of a metallic pipe in which an exciter coil and pickup coil are supported in a cylindrical housing or an exploration unit for oil well casings and the like, in coaxially aligned spaced apart relation upon a core of insulating material, the exciter coil being energizable with electric oscillations of the order of 10 to 50 kilocycles per second, and of sufficiently high frequency that the exciter coil forms a first source of electromagnetic radiations into space that will produce a skin effect in the circumferentially surrounding inner wall of the associated pipe so as to develop eddy currents in the inner surface of the pipe and thus provide a second source of electromagnetic radiations into space, the radiations from these two sources being received by the pickup coil wherein they are combined to produce signal currents indicative of the average inside diameter of the pipe being measured.

This application is a continuation of our application Ser. No. 626,358, filed Mar. 7, 1967, now abandoned, which in turn was a continuation of our application, Ser. No. 422,175, filed Dec. 30, 1964, now abandoned.

This invention relates generally to apparatus for electromagnetically measuring the inside diameter of a cylindrical structure and particularly relates to an electronic inside pipe caliper.

It is frequently necessary to measure the inside diameter of a pipe. This is particularly true of the casing of an oil well or of a string of tubing disposed within an oil well, for example, to pump out the oil of the well.

Such metallic pipes are buried in the ground and, hence, are not accessible for measurement. Both the inside and the outside of such metallic pipes is subject to corrosion damage. The corrosion may be caused by injected fluids or by corrosive fluids within the ground. Besides, the pipe may be subjected to internal wear from the rods of pumps or from wear due to wire lines which may be sent into the well. Also, wear may be caused by drilling or fishing operations utilizing a drill pipe.

Measuring the damage of a pipe due to corrosion or wear is important in order to apply protective measures or to repair or replace the pipe depending on circumstances.

Of course, it should be realized that the internal diameter of the pipe in an oil well may vary due to permissible deviations of the wall thickness and of the nominal pipe diameter.

Since there is a real need to determine the inside diameter of buried metallic pipes, various instruments have been developed in the past for this purpose. Most of these instruments utilize mechanical feelers which are urged by spring means against the inner wall of the pipe. When one of the feelers is deflected due to the existence of pits, cracks, and other effects of corrosion or erosion of the pipe, an electric signal may be generated which is utilized to record such deviation. This may, for example, be effected by associating a magnet with the feelers. The magnet is rotated sequentially past the various feelers so that a deflection of the feeler changes the magnetic reluctance of the magnetic path which, in turn, induces an electrical signal that can be recorded.

Some of these mechanical feeler calipers utilize two sets of feelers, one for measuring the maximum penetration of the feeler, while the other continuously measures the average penetration of the feelers.

However, a pipe caliper of the type having mechanical feelers has a number of disadvantages. For example, such an instrument cannot detect longitudinal splits or cracks of the pipe. The pipe may be covered with paraffin, scale or other non-metallic material which may cover up faults in the pipe. The feeler, of course, cannot distinguish between a metallic pipe and non-metallic material which may cover the pipe. Therefore, certain pits covered by hardened oils and the like cannot be detected.

Finally, each of the many feelers may scratch the pipe or scratch off the protective coating of the pipe. Even if the pipe has not been covered with a protective coating, the scratches caused by the feelers may initiate further corrosion. Consequently, the mechanical feeler-type instrument may cause the very corrosion it is intended to measure.

In order to overcome these drawbacks of pipe calipers having a mechanical sensing device, it has been proposed to utilize a magnetic caliper. This instrument makes use of a permanent magnet which is periodically rotated within the pipe. The gap between the surface of the magnet and the pipe is utilized to sense changes of the diameter of the pipe. To this end, use is made of Hall-effect elements within the gap.

It will be realized from the above description that it is necessary to rotate the magnet within the pipe. Hence, even this instrument requires moving parts.

In addition, if the pipe or metallic casing to be measured has become magnetic or has a magnetic anomaly, the magnetic pipe caliper will produce erroneous results.

It should be pointed out that there is an instrument which electronically measures the wall thickness of a pipe. This instrument, however, neither indicates the inside nor the outside diameter of the pipe. Hence, with this instrument it is not possible to tell whether corrosion took place inside or outside of the pipe; nor does the instrument indicate minor anomalies in the internal or external surface of the pipe.

It is accordingly an object of the present invention to provide an inside pipe caliper which requires no moving parts and which will overcome the disadvantages of prior instruments.

Another object of the present invention is to provide an inside pipe caliper which operates on electronic principles, which requires no moving parts, which does not touch the pipe, and which permits the transmission of an electric signal to the surface of the ground.

Still another object of the present invention is to provide an electronic inside pipe caliper which is simple in construction, reliable in operation, and which has a linear relationship between the magnitude of the output signal and the variation of the inside diameter of the pipe which is being measured.

An electronic device in accordance with the present invention for measuring and recording the average inside diameter of a metallic pipe comprises an exciter coil. The exciter coil is excited, for example, by an electronic oscillator to radiate electric oscillations. Preferably, the electric oscillations have a frequency sufficiently high to cause a skin effect within the pipe to be measured. There is also provided a pickup coil which is disposed at a fixed distance and spaced from the exciter coil for picking up oscillations emitted by the exciter coil. These are both direct oscillations radiated by the exciter coil as well as oscillations caused by the skin effect in a pipe.

The two coils are spaced at a fixed distance from each other and moved within the pipe for measuring the average pipe diameter.

The oscillatory currents developed by the pickup coil may be rectified, amplified and then sent to the surface of the ground for recording. Alternatively, it is equally feasible to send the high frequency currents directly up a cable toward the surface.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a schematic sectional view of a portion of an oil well having therein the instrument of the invention and also illustrating a recorder at the surface of the ground;

FIG. 2 is a longitudinal sectional view of the instrument of the invention including an exciter coil and a pickup coil; and FIG. 3 is an electric block diagram including the exciter and pickup coils of the invention and associated electric equipment.

Referring now to the drawings and particularly to FIG. 1, there is illustrated a typical oil well 10 provided with a pair of casings 11 and 12 which may be interconnected by a casing collar 13.

At the surface of the ground there is illustrated surface equipment which may include a hoisting drum 14 from which a hoisting cable conductor 15 is trained over a guide pulley 16 and connected to an exploration unit 18 in logging position in well 10 and embodying the present invention. It might be noted that the cable conductor 15 preferably is an armored cable having a single central conductor and insulated sheath. The hoisting drum 14 is provided with a suitable indicating mechanism such as a rotating pointer 20 associated with a graduated dial 21 or other means for indicating the amount of cable which has been wound and unwound thereon. In other words, the indicating device shows the depth of the exploration unit 18 as measured by the amount of cable that has been lowered into well 10.

A calibrated recorder 22 may be utilized for recording the signal developed by the exploration unit 18. The recorder may be driven in a suitable manner in synchronism with the movement of the depth indicator. The recorder 22 is connected to the cable 15 by a slip ring and brush arrangement 23 and a lead 24.

The exploration unit 18 may comprise an upper narrow portion 30 and a lower narrow portion 31, each of which may be provided with a bow spring (not shown) for centering the main housing 32 within the well, that is, within the casing such as 11 or 12. The main housing 32 includes a central core 33 which may, for example, consist of steel. The steel core 33 is surrounded by a hollow cylinder 34 which preferably consists of an insulating material such, for example, as hard rubber. It will be noted that the rubber cylinder 34 has conical outer portions such as shown at 35 for a purpose to be explained hereinafter.

An exciter coil 36 is disposed adjacent one end of and within the rubber cylinder 34 while a pickup coil 37 is wound adjacent the other end thereof. The purpose of the exciter coil 36 is to radiate electromagnetic waves of a predetermined frequency which are then picked up by the pickup coil 37.

The two coils 36 and 37 are preferably protected by an outer cylindrical sheath 40, which may, for example, consist of rubber.

The housing 32 may have a tapered end portion or nose 41 having a threaded central aperture 42 into which the outer end of the steel core 33 may be screwed as shown. For indexing purposes the nose 41 of the housing may be provided with a cylindrical opening 43 while the rubber cylinder 34 has a similar communicating opening 44. An indexing dowel 45 may be disposed in the two openings 43 and 44 for preventing rotation of the rubber cylinder 34, with respect to the housing end portion.

Suitable leads such as 46 interconnect the coil 37 to the upper housing end 30 and extend through a channel 47 in the housing nose 41. A similar cable 48 connects the coil 36 to the housing end 30.

The free space between the rubber cylinder 34 and the outer sheath 40 formed, for example, between the core 35 and the sheath preferably is filled with oil to equalize the pressure within the unit 18. A rubber tube bellows 50 is interconnected by a channel 51 to the free space between the rubber cylinder 34 and outer sheath. The bellows 50 is designed to contract and expand to accommodate the differential expansion of the oil inside of the unit.

An annular recess 52 is provided in the end of the steel core 33 for securing the rubber sheath 40 thereto. This may, for example, be effected by a wire clamp indicated at 53. Similarly, an annular recess 54 is provided in the outer housing end 41 for securing thereto the rubber sheath 40 by means of another wire clamp 55.

Referring now to FIG. 3, there is illustrated schematically the electronic equipment of the tool of the FIGS. 1 and 2. It should be noted that this equipment may, for example, be disposed in the upper housing portion 30. Thus, there may be provided an oscillator 60 connected to the exciter coil 36 by the cable or leads 48. The oscillator 60 could be any conventional oscillator. Preferably, it consists of a transistor oscillating circuit which requires only a low voltage, say 12 volts, and which can readily be designed to be stable even at elevated temperatures.

The oscillator 60 is supplied with power from power supply batteries 61 connected thereto by a lead 62.

The pickup coil 37 is connected by the leads or cable 46 to a rectifier 65 which, in turn, is connected to a direct current amplifier 66 by suitable leads 67. The DC amplifier 66 is connected to the power supply 61 by a lead 68. The output of the amplifier 66 is connected to the cable 15 and then leads to the recorder 22.

The operation of the electronic pipe caliper of the invention will now be described. The oscillator 60 is designed to generate high frequency oscillations of the order of between 10 and 50 kilocycles per second (kc.). The oscillator frequency should be high enough to produce a skin effect in the inner wall of the pipe such as a casing or oil well tubing. This requires a frequency of the order of 10 to 100 kc. On the other hand, the higher the frequency gets, the more difficulties are encountered in designing a stable oscillator and a suitable exciter coil and pickup coil. Therefore, for practical purposes a frequency range of between 10 and 50 kc. is preferred.

Thus, when the oscillator 60 is operating, it will supply the exciter coil 36 with high frequency oscillatory currents which are then radiated into space. If the instrument is disposed within a suitable pipe, eddy currents will be developed in the inner surface of the pipe. These eddy currents are induced by the electromagnetic field developed by the exciter coil. As pointed out before, due to the skin effect, these eddy currents will not penetrate very deeply into the interior of the pipe.

The pickup coil 37 now picks up the electromagnetic waves radiated by the exciter coil. These waves are partially those which flow directly from the exciter coil to the pickup coil and partly correspond to the voltage induced by the eddy currents in the pipe.

These high frequency alternating voltages may subsequently be rectified by the rectifier 65, amplified by the DC amplifier 66 and transmitted over the cable 15 having a single conductor to the surface of the ground where they are recorded on the recorder 22. It should be noted, however, that it is not necessary to rectify the alternating currents induced in the pickup coil. Thus, the rectifier within the well unit may be omitted and the signals may be transmitted to the surface in their alternating current form. It should also be noted that it is not necessary to provide a power supply such as 61 in the instrument. Instead, it is feasible to transmit either direct current or alternating from the surface of the ground to the tool for either powering the equipment directly in the case of direct, or for first rectifying it in case of an alternating current.

The spacing of the two coils 36 and 37 is somewhat critical. The distance between the two coils should be small in order to get detail. However, the closer the two coils are together, the smaller the range of operation of the tool is. In other words, if the two coils are very close together only a limited variation of the internal diameter of the pipe can be measured. On the other hand, if the spacing between the two coils is made wider, the response becomes more linear. It has been found that the optimum ratio of coil spacing to pipe inside diameter lies between 0.3 and 0.6. It should also be noted that as the diameter of the pipe increases, so does the signal induced in the pickup coil 37. In a practical instrument it has been found that the calibration is linear for an internal diameter of the pipe between 6.1 and 6.7 inches. For this variation of the internal diameter, a deflection of the pen of the recorder of five inches was found. Since the instrument responds only to the presence of conductors such as a metal, it disregards insulating deposits on the pipe.

Preferably, the pickup coil 37 is tuned to the frequency of the oscillator 60 although that is not necessary. The instrument will also record the presence of a casing collar because this represents a variation of the casing internal diameter.

There has thus been disclosed an electronic device for measuring and recording the average inside diameter of a metallic pipe. The instrument does not require any moving parts nor is it necessary to touch the inner diameter of the pipe that is being measured. An electrical signal is developed which may be directly and linearly proportional to the variation of the inside diameter of the pipe. Since the instrument operates by electromagnetic waves, it responds only to the metal of a pipe and will disregard any insulating materials which may be deposited on the inner surface of the pipe.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example and we do not wish to be restricted to the specific form shown or uses mentioned except as defined in the accompanying claims, wherein various portions have been separated for clarity of reading and not for emphasis.

We claim:
1. An electronic device for measuring and recording the average inside diameter of metallic pipes, which comprises:
  (a) cylindrical housing means including a central core surrounded by an annular space;
  (b) body means of insulating material in said space surrounding said core;
  (c) an exciter coil coaxially supported on the periphery of said body means;
  (d) a pickup coil coaxially supported on the periphery of said body means in axially spaced relation to said exciter coil;
  (e) a protective outer cylindrical sheath of insulating material means sealingly surrounding and protecting said coils;
  (f) means for exciting said exciter coil to produce electric oscillations for direct radiation to said pickup coil, said oscillations having a frequency sufficiently high so that a skin effect is produced in the circumferentially surrounding pipe wall for emitting radiations to said pickup coil, whereby the radiations from the exciter coil and the skin effect are combined in the pickup coil to provide a signal indicative of the inside diameter of the pipe; and
  (g) means for recording the signal from said pickup coil to indicate the average inside diameter of a pipe being measured.

2. An electronic device according to claim 1, wherein the exciter coil electric oscillations have a frequeny between substantially 10 and substantially 50 kilocycles per second.

3. An electronic device according to claim 1, including means for moving the housing and spaced coils as a unit axially within the pipe, and means for rectifying the signal currents from the pickup coil prior to recording.

4. An electronic device according to claim 1, wherein the sealing means includes an outer sheath of insulating material of a diameter less than that of the pipe to be measured.

5. An electronic device according to claim 1, wherein the spacing between said exciter coil and said pickup coil is so chosen that the rectified signal has a substantially linear relation to variations of the inside diameter of the pipe.

References Cited
UNITED STATES PATENTS

| | | | |
|---|---|---|---|
| 2,527,170 | 10/1950 | Williams | 324—34 |
| 2,540,588 | 2/1951 | Long | 324—34 |
| 2,573,799 | 11/1951 | MacLean | 324—34 |
| 2,698,920 | 1/1955 | Gieske | 324—34 |
| 2,992,390 | 7/1961 | De Witte | 324—34 |
| 3,060,377 | 10/1962 | Schmidt | 324—37 |
| 3,075,144 | 1/1963 | Cooper | 324—34 |
| 3,114,876 | 12/1963 | Schuster | 324—34 |
| 3,166,710 | 1/1965 | Schmidt | 324—34 |

RUDOLPH V. ROLINEC, *Primary Examiner.*

R. J. CORCORAN, *Assistant Examiner.*

PO-1050
(5/69)

UNITED STATES PATENT OFFICE
CERTIFICATE OF CORRECTION

Patent No. 3,417,325      Dated December 17, 1968

Inventor(s) IRA J. McCULLOUGH and STANLEY G. STROUD

It is certified that error appears in the above-identified patent and that said Letters Patent are hereby corrected as shown below:

Column 6, line 39, for the numeral "1" read --3--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents